(12) United States Patent
Medin et al.

(10) Patent No.: US 6,760,520 B1
(45) Date of Patent: Jul. 6, 2004

(54) SYSTEM AND METHOD FOR PASSIVELY ALIGNING AND COUPLING OPTICAL DEVICES

(75) Inventors: Michael W. Medin, Roswell, GA (US); Eric T. Marple, Atlanta, GA (US)

(73) Assignee: Teralux Corporation, Atlanta, GA (US)

( * ) Notice: Subject to any disclaimer, the term of this patent is extended or adjusted under 35 U.S.C. 154(b) by 317 days.

(21) Appl. No.: 09/851,602

(22) Filed: May 9, 2001

Related U.S. Application Data

(60) Provisional application No. 60/202,589, filed on May 9, 2000.

(51) Int. Cl.[7] .............................. G02B 6/26; G02B 6/36
(52) U.S. Cl. ............................................ 385/43; 385/88
(58) Field of Search .............................. 385/39, 42–25, 385/88–92, 147

(56) References Cited

U.S. PATENT DOCUMENTS

| | | | | |
|---|---|---|---|---|
| 3,965,287 A | * | 6/1976 | Mueller | 174/66 |
| 5,267,077 A | * | 11/1993 | Blonder | 359/280 |
| 5,870,417 A | * | 2/1999 | Verdiell et al. | 372/32 |
| 2003/0044118 A1 | * | 3/2003 | Zhou et al. | 385/43 |

FOREIGN PATENT DOCUMENTS

| | | | | |
|---|---|---|---|---|
| JP | 10335146 | * | 10/1998 | 385/43 |

OTHER PUBLICATIONS

Michael J. Robertson, Ian F. Lealman, and John V. Collins, *The Expanded Mode Laser—A Route to Low Cost Opto electronics*, IEICE Trans. Electron., vol. E80–C, No. 1, Jan. 1997, pp. 17–23.

Yoshio Itaya et al., *Spot–Size Converter Integrated Laser Diodes (SS–LDs)*, IEICE Trans. Electron., vol. E80–C, No. 1, Jan. 1997, pp. 30–36.

S.S. Saini, et al. , *Compact Mode Expanded Lasers Using Resonant Coupling Between a 1.55–μm InGaAsP Tapered Active Region and an Underlying Coupling Waveguide*, IEEE Photonics Technology Letters, vol. 10, No. 9, Sep. 1993.

Regis S. Fan and R. Brian Hooker, *Tapered Polymer Single–Mode Waveguides for Modes Transformation*, Journal of Lightwave Technology, vol. 17, No. 3, Mar. 1999, pp. 466–474.

* cited by examiner

*Primary Examiner*—Akm Enayet Ullah

(57) ABSTRACT

An external mode size transformer includes a waveguide having an input section, an output section, and a tapered section disposed between the input and output sections. The cross sections between the input and output sections of the waveguide can vary smoothly throughout the length of the waveguide, similar to a waveguide shaped like a boat hull. By positioning the external mode size transformer between optical devices, coupling between optical devices is substantially improved compared to that of direct coupling. For example, by positioning the external mode size transformer between a laser and an optical fiber, laser to fiber coupling is significantly improved compared to that of direct coupling between these optical devices. The present invention can include a manufacturing method that employs multiple masks with predetermined shapes to fabricate the sections of the waveguide within a planar substrate via an exemplary ion exchange process.

9 Claims, 6 Drawing Sheets

SYSTEM AND METHOD FOR PASSIVELY ALIGNING AND COUPLING OPTICAL DEVICES

PRIORITY AND RELATED APPLICATIONS

The present application claims priority to provisional patent application entitled, and assigned U.S. application Ser. No. 60/202,589.

TECHNICAL FIELD

The present invention relates to optical devices and the alignment thereof. More particularly, the present invention relates to a system and method for passively aligning and coupling optical devices with an external mode size transformer.

BACKGROUND OF THE INVENTION

Optical communications systems offer the potential for widespread delivery of broadband services to businesses and residences if the cost of optical termination can be reduced. An optical communications system can comprise an optical transmitter, a fiber optic transmission line, and an optical receiver. For typical telecommunication applications, the transmitter is comprised of a direct-modulated semiconductor laser diode 100 as illustrated in FIG. 1. The transmission line is single-mode fiber and the receiver is a semiconductor photo-diode (not shown). In recent years the cost of single-mode fiber has dropped dramatically relative to that of metallic transmission media, but the cost of the opto-electronic devices used in the transmitters and receivers are still expensive relative to their electronic counterparts.

In addition to the cost of opto-electronic devices themselves, a time-consuming and costly step in the manufacture of laser transmitter modules involves the alignment of the fiber optic pigtail 110 (the short fiber optic lead that protrudes from the module package for optical interconnection) with the laser diode facet 115 (the point on the edge of the diode from which the laser beam emerges). For optimal transfer of laser energy from the facet 115 to the fiber core 120 (coupling efficiency), the tip 125 of the fiber pigtail 110 typically is precisely positioned with respect to the laser facet 115 prior to fastening and encapsulation in the module package. This is usually done using active alignment techniques, in which the laser diode 100 is powered up and the output optical power is monitored via the pigtail 110 while manipulating the pigtail tip 125 in up to five dimensions—transverse A, lateral B, longitudinal C, and axial pitch D and yaw E (FIG. 1). This step distinguishes opto-electronic device packaging from semiconductor device packaging, and is considered the prime factor impeding further cost reduction in laser module production. Passive alignment techniques aim to eliminate this active alignment step in the packaging process.

Passive alignment of laser to fiber using purely mechanical means can be complicated by the extremely tight tolerance required to achieve adequate coupling efficiency. The reason for this tight tolerance is because of the small size of the optical mode of the laser (optical mode refers to the spatial distribution of electromagnetic energy of the fundamental mode propagating from the laser waveguided region through the core of the single-mode fiber). Typical semiconductor lasers have mode sizes of approximately 1 micron ($\mu$m) and emission angles of more than 30° in the transverse dimension; furthermore, the emission beam is an expanding elliptical cone 130 spreading more in the transverse direction than in the lateral direction. The fiber core 120, on the other hand, supports a weakly guided optical mode that is typically 8–10 $\mu$m in size and circular in shape with a 6–7° acceptance angle. If the fiber pigtail 105 is simply butt-coupled to the laser 100, the modal mismatch results in poor coupling efficiency. Coupling efficiency can be improved by fabricating a conical or spherical lens 135 directly onto the tip of the fiber; the lens alters the mode size and acceptance angle of the fiber 135 so as to better match that of the laser facet 115. However, this increased coupling efficiency occurs at the expense of tighter alignment tolerance. The sub-micron tolerance needed to passively align a tensed fiber is tighter than can be reliably maintained with current automated assembly equipment.

There has been published investigation into the use of mode size transformers to address the current difficulties of passive alignment. A conventional mode size transformer (also called spot-size converter or mode expander) employs a specially tapered waveguide structure that increases the mode size of the laser to match that of the fiber. In doing so, larger alignment tolerances are possible with good coupling efficiencies, offering a way to lower packaging cost. Concurrently, the use of conventional micromachined silicon submount technology (also called silicon optical bench or silicon platform) for mechanical positioning of fibers with respect to other optical or opto-electronic devices is rapidly advancing for passive alignment and automated packaging of integrated optics (integrated optics refers to the combining of multiple optical elements within a single module by waveguiding light between them). A common and conventional silicon submount structure can comprise a V-groove having dimensions suitable for holding a fiber with precise lateral, transverse and axial position limited only by the +/−1 $\mu$m tolerance of fiber corto-cladding concentricity. Employing a mode size transformer that provides good laser-to-fiber coupling even when the laser and fiber are misaligned up to 1 micron from their ideal alignment, then, would permit the use of silicon submount technology for laser-to-fiber passive alignment This is the goal of the conventional published mode size transformer investigation.

Different conventional approaches have been investigated for monolithically integrating a mode size transformer into the semiconductor layers of a laser diode. A conventional expanded mode laser design can include a laser waveguided (active) region that is laterally tapered and built on top of a uniform weak passive waveguide layer. Adiabatic mode expansion between the active and passive layers of this structure can result in a significant reduction of the transverse emission angle of the laser, thus permitting much greater laser-to-fiber coupling efficiency. Three conventional different integrated mode transformer structures have been evaluated: one with a transversely tapered waveguide, one with a laterally tapered waveguide, and one comprising a small cross section of an active layer. Some conventional structures employ a shape in the laterally tapered active region that has been optimized. However, a disadvantage of the conventional integrated mode size transformer is the greater complexity and cost of processing the laser diode wafer to incorporate these waveguide structures.

A tapered waveguide structure external to the laser diode can also function as a mode size transformer. Tapered polymer waveguides designed to perform mode transformation between the laser facet and the optical fiber have been described in the conventional art. Such structures can include two laterally tapered waveguide layers stacked one on top of the other. One of the waveguide layers can form the input section that is optimized for coupling with the laser facet and confining the fundamental mode; the input section up-tapers laterally to a larger output section that is matched to the mode diameter of the fiber core. The other waveguide layer can laterally taper from zero width to the width of the first layer at the output section; the first layer can support mode expansion in the transverse dimension between the input section and the output section such that the output mode profile is approximately circular (i.e. matched to the fiber mode profile). One advantage of this conventional tapered waveguide structure is its ease of fabrication using polymer materials. However, polymer materials have not been widely accepted in telecommunications applications due to concern over long-term optical stability of polymers. Silica and glassy materials are typically preferred over polymers for use in optical waveguides intended for telecommunications because of their robust environmental stability.

Accordingly, there is a need in the art for a method and system for efficiently coupling one optical device to another. More specifically, there is also a need in the art for a method and system that can passively align a first optical device with a second optical device with high efficiency.

SUMMARY OF THE INVENTION

The present invention is generally drawn to a system and method for passively aligning optical devices. More specifically, according to one aspect, the present invention is generally drawn to an external mode size transformer comprising a waveguide having an input section, an output section, and a tapered section disposed between the input and output sections. The input section of the waveguide can comprise a volume having a first cross sectional arm The output section can comprise a volume with a second cross sectional area that is greater than the first cross sectional area. The tapered section can comprise a varying cross sectional area that has cross section substantially equal to the first cross sectional area on one end and a cross section substantially equal to the second cross sectional area on another end.

The input section of the waveguide can be designed to capture a fundamental mode of a first size emanating from a first optical device while the output section can be designed to match a modal profile of a second optical device with a second mode size. In one exemplary embodiment, the second mode size can be larger than the first mode size. For example, the input section can be designed to capture a fundamental mode of a semiconductor laser while the output section of the waveguide can be designed to match a modal profile of a single-mode optical fiber. The tapered section can be designed to gradually transform the modal profile from that of the input section to that of the output section of the waveguide. The cross sections between the input and output sections of the waveguide can vary smoothly throughout the length of the waveguide, similar to a waveguide shaped like a boat hull.

The smoothly varying cross section dimensions of the tapered section of the waveguide is yet one physical property of the waveguide that is not found and cannot be achieved with the conventional art methods. In other words, the smooth and circular or rounded cross sections of the tapered section as well as the input and output sections of the waveguide are not attainable with conventional layering processes. Further, the waveguide can also have smooth or abrupt changes or both in the refractive indexes of the sections that form the waveguide. Such smooth or abrupt changes (or combination thereof) in the refractive indexes of the waveguide sections cannot be achieved with conventional art techniques.

The dimensions of each section of the waveguide as well as the refractive index profile of each section can be controlled during the exemplary manufacturing method according to another aspect of the present invention. The waveguide can have a step index profile that is roughly elliptical with a flat top. The waveguide of the transformer can also comprise glassy materials that can be manufactured with an exemplary ion exchange process according to the manufacturing method of the present invention.

By positioning the external mode size transformer between optical devices, coupling between optical devices is substantially improved compared to that of direct coupling. For example, by positioning the external mode size transformer between a laser and an optical fiber, laser to fiber coupling is significantly improved compared to that of direct coupling between these optical devices. Additionally, coupling efficiency is typically not degraded if either optical device is misaligned with the external mode size transformer by less than one micron. Such a tolerance for misalignment can make the present invention compatible with silicon submount techniques for passive alignment of optical devices. The present invention can be used for fiber coupling of semiconductor optical amplifiers (SOA), and can serve as an optical coupler in various other hybrid-integrated optical devices.

According to another aspect of the present invention, the external mode size transformer can be manufactured with an exemplary ion exchange process. More specifically, the present invention can comprise a manufacturing method that employs multiple masks with predetermined shapes to fabricate the sections of the waveguide within a planar substrate. Using multiple masks can enable the ion diffusion to penetrate to a greater depth in the areas exposed by the masks. During ion diffusion or the ion exchange process, sodium ions within the planar substrate can be replaced with ions of an appropriate metal, such as silver (Ag) or potassium (K) through an electrochemical reaction. The resultant waveguide of the external mode transformer can feature a smoothly varying refractive index cross section throughout the length of the waveguide.

According to yet another aspect of the present invention, the external mode size transformer can be employed in a method for passively aligning optical devices. More specifically, in one exemplary embodiment, the external mode size transformer in addition to a laser diode and an optical fiber can be positioned within a V-groove of a silicon submount. By using the V-groove of the submount and other alignment tools such as cladding strips attached to each optical device that are placed in the V-groove, the external mode size transformer, optical fiber, and laser diode can be passively aligned in an efficient manner.

DETAILED DESCRIPTION OF THE EXEMPLARY EMBODIMENTS

Figure 1:
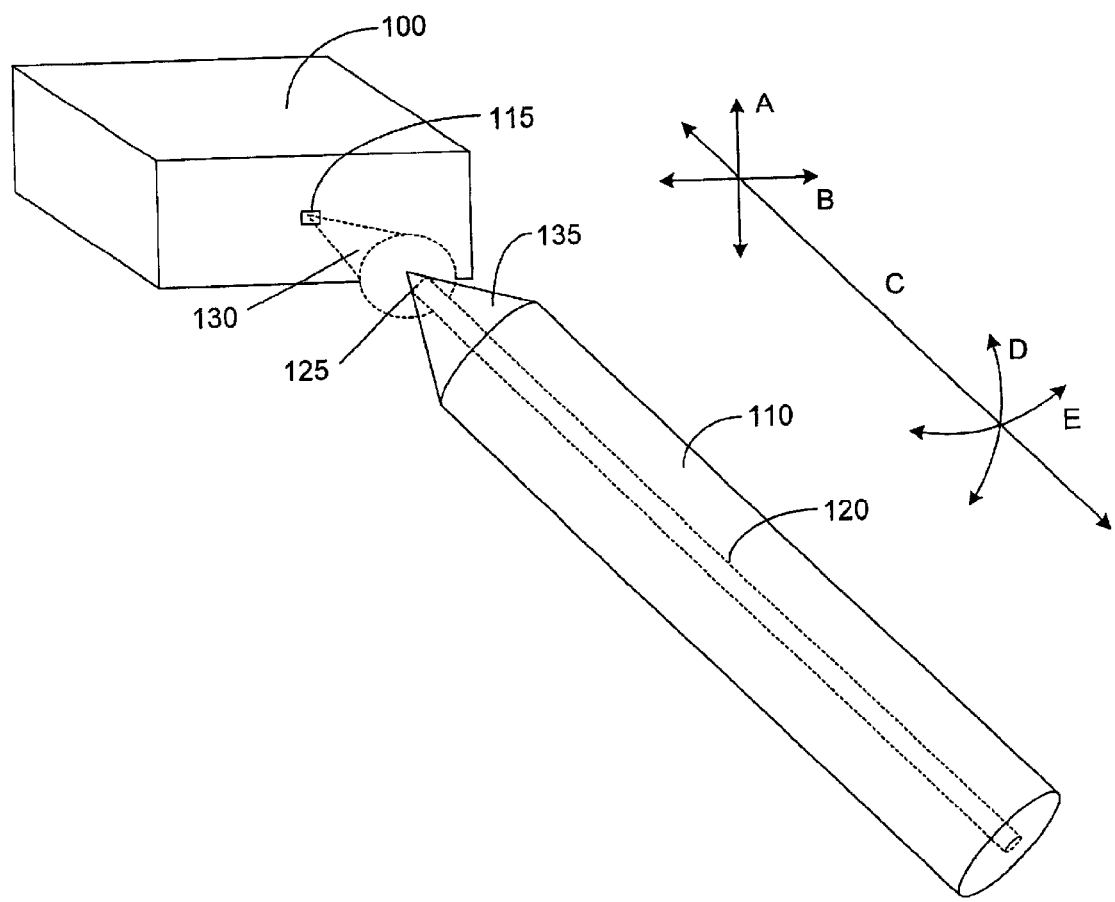
FIG. 1 is a diagram illustrating a conventional system and method for actively aligning a laser diode and an optical fiber pigtail.

The present invention may be embodied in an external mode size transformer that comprises a waveguide having an input section, an output section, and a tapered section disposed between the input and output sections. The present invention can comprise a method for creating an external mode size transformer that employs a planar substrate in combination with an ion exchange process. Further, the present invention may further comprise a method for passively aligning two or more optical devices with an external mode size transformer. The method for passively aligning optical devices can be automated or the method can be completed with human manipulation of the optical devices and the external mode size transformer.

Referring now to the drawings, in which like numerals represent like elements throughout the several figures, aspects of the present invention in the exemplary embodiments thereof will be described.

Figure 2:
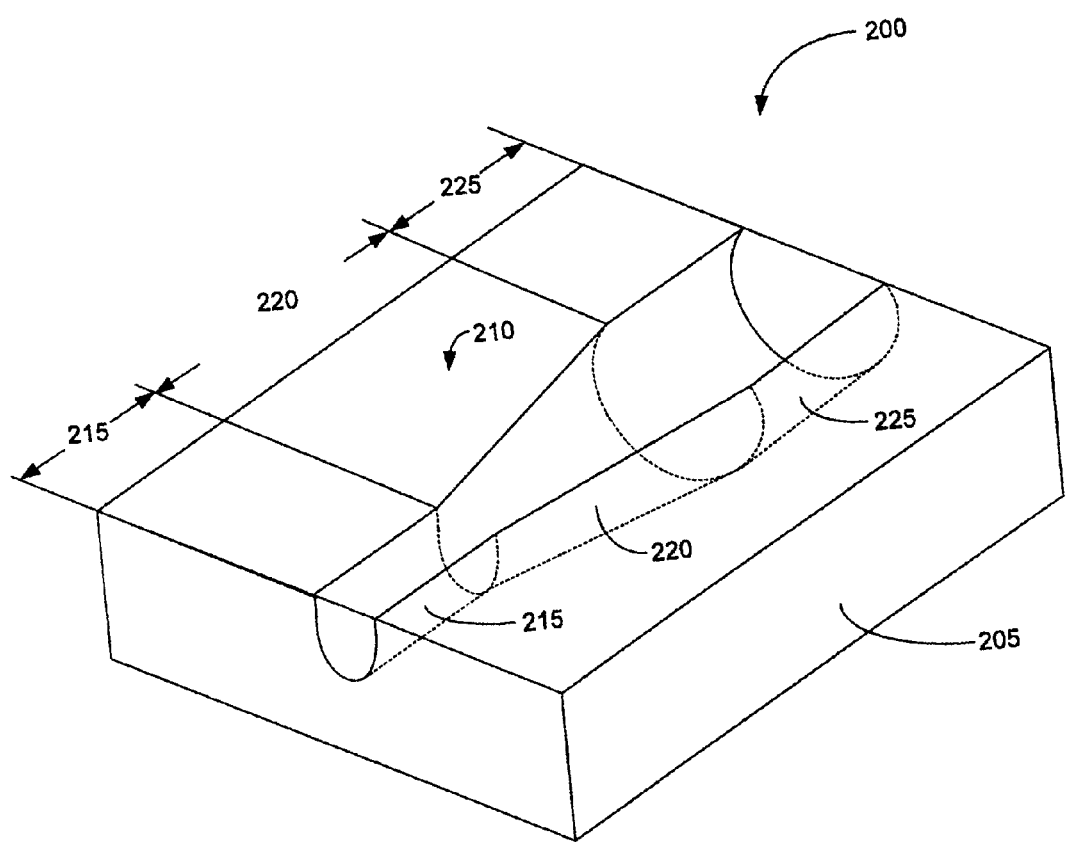
FIG. 2 is a diagram illustrating an exemplary external mode size transformer according to the present invention.

FIG. 2 is a diagram illustrating an exemplary external mode size transformer 200 that comprises a planar substrate 205 and a waveguide 210 disposed therein. The waveguide 210 may comprise an input section 215, a tapered section 220, and an output section 225. The waveguide 210 provides a smoothly tapered weakly-guided three-dimensional waveguide having a modal profile that is matched to that of a first optical device on one end and another modal profile matched to that of a second optical device on the other end. As noted above, an optical mode refers to the spatial distribution of electromagnetic energy of a fundamental mode that may propagate within an optical device such as an optical waveguide.

The input section 215 of the waveguide 210 can comprise a volume having a first cross sectional area The output section 225 of the optical waveguide 210 can comprise a volume with a second cross sectional area that is greater than the first cross sectional area. The tapered section 220 can comprise a varying cross sectional area that has a cross section substantially equal to the first cross sectional area of the first section 215 on one end and a cross section substantially equal to the second cross sectional area of the output section 225 on another end.

The waveguide 210 in one exemplary embodiment is fabricated with a planar substrate 205 using an ion exchange process discussed in further detail below. The planar substrate 205 may comprise glass, silica, or other like glassy materials that are receptive to ion exchange processes. The input section 215 of the optical waveguide 210 functions to capture as much of a fundamental mode of light energy emanating from a first optical device. The tapered section 220 of the waveguide 210 can gradually "transform" the modal profile from that of the input section 215 to that of the output section 225 with minimal energy loss. The output section 225 can function to match the modal profile of a second optical device (not shown). Those skilled in the art will appreciate that light energy can be propagated in either direction with the external mode size transformer 200 of the present invention.

That is, while light energy propagates from the input section 215 to that of the output section 225 of one exemplary embodiment, it is not beyond the scope of the present invention to reverse the roles of the input and output sections 215, 225. In another exemplary embodiment (not shown), the output section 225 could easily receive light energy and forward this light energy through the tapered section 220 to the input section 215. Further, those skilled in the art will appreciate that the waveguide 210 does not require input and output sections 215, 225. In other words, the waveguide 210 could comprise only a tapered section 220 without departing from the scope and spirit of the invention.

In one exemplary embodiment, the input section 215 of the waveguide 210 can have a modal profile that is matched to a laser facet. The output section 225 of waveguide 210 could be designed to match the model profile of a single-mode optical fiber. By positioning the external mode size transformer 200 between a laser facet and a single-mode fiber, laser-to-fiber coupling efficiency can be significantly improved over direct coupling. Furthermore, coupling efficiency is not significantly degraded if either the laser facet or fiber core are misaligned with respect to the waveguide 210 by less than one micron. Because of such misalignment tolerances, the external mode size transformer 200 makes this coupling method compatible with silicon submount techniques for passive alignment between optical devices.

The dimensions of each section of the optical waveguide 210 can be controlled during the fabrication process of the optical waveguide 210, as can be refractive index profile of the waveguide 210. The optical waveguide 210 can have a step index profile that is roughly elliptical with a flat top. Further, the cross section dimensions of each section 215, 220, and 225 of the optical waveguide 210 can very smoothly throughout the length of the optical waveguide 210 creating a waveguide shape that can be characterized as a boat hull. The smoothly varying cross section dimensions is yet one physical property of the waveguide 210 that is not found and cannot be achieved with the conventional art methods. In other words, the smooth and circular or rounded cross sections of the waveguide 210 are not attainable with conventional layering processes. Further, waveguide 210 can also have smooth or abrupt changes or both in the refractive indexes of the sections in the waveguide 210. Such smooth or abrupt changes (or combination thereof) in the refractive indexes of the waveguide sections cannot be achieved with conventional art techniques. Those skilled in the art will appreciate that different dimensions, different tapered section and shapes, and refractive index profiles can be varied without departing from the scope and spirit of the present invention.

Figure 3:
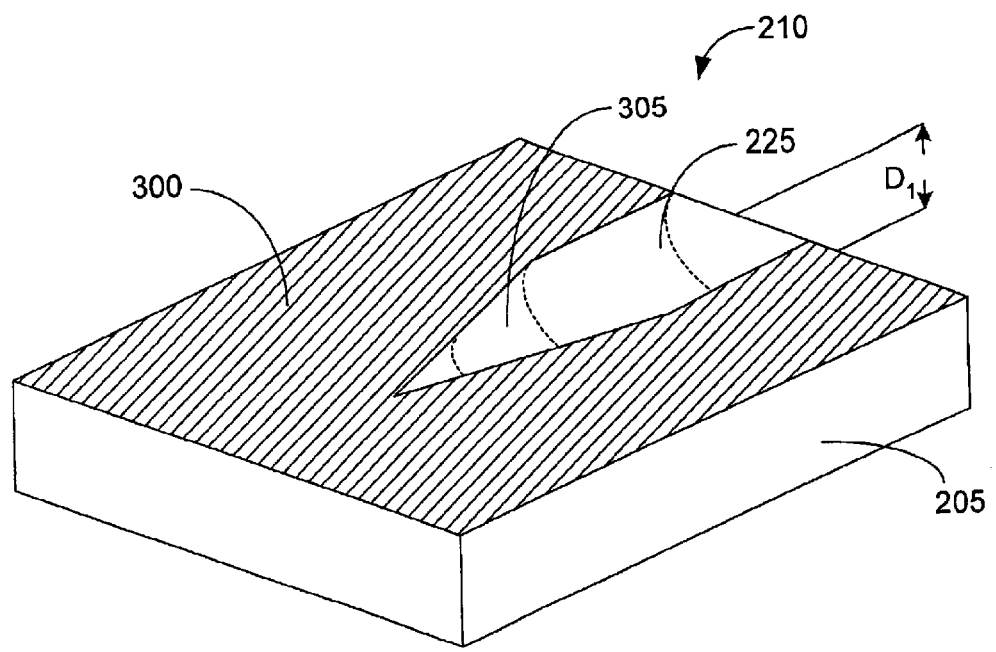
FIG. 3 is a diagram illustrating an exemplary mask that exposes a lateral taper of a tapered section as well as an output section of an optical waveguide disposed within a planar substrate.

The waveguide 210 can be fabricated from a planar substrate 205 using an exemplary ion exchange process discussed in further detail below. Referring now to FIG. 3, this figure illustrates one stage during the fabrication of the optical waveguide 210 that is created within the planar substrate 205. This figure illustrates a first mask 300 which exposes a lateral taper 305 of the soon to be formed tapered section 220. The mask 300 also exposes one stage of the formation of the output section 225. In one exemplary embodiment, the mask 300 is designed to resist ion diffusion such that the open areas of the mask containing the lateral taper 305 and output section 225 can receive penetration of metal ions during an ion exchange process. The first mask 300 can be employed during a first stage of fabrication for the optical waveguide 210. The first mask is employed until a first depth $D_1$ is achieved. Those skilled in the art will appreciate that the number and sizes of masks used in the exemplary process can be varied or changed without departing from the scope and spirit of the present invention.

Figure 4:
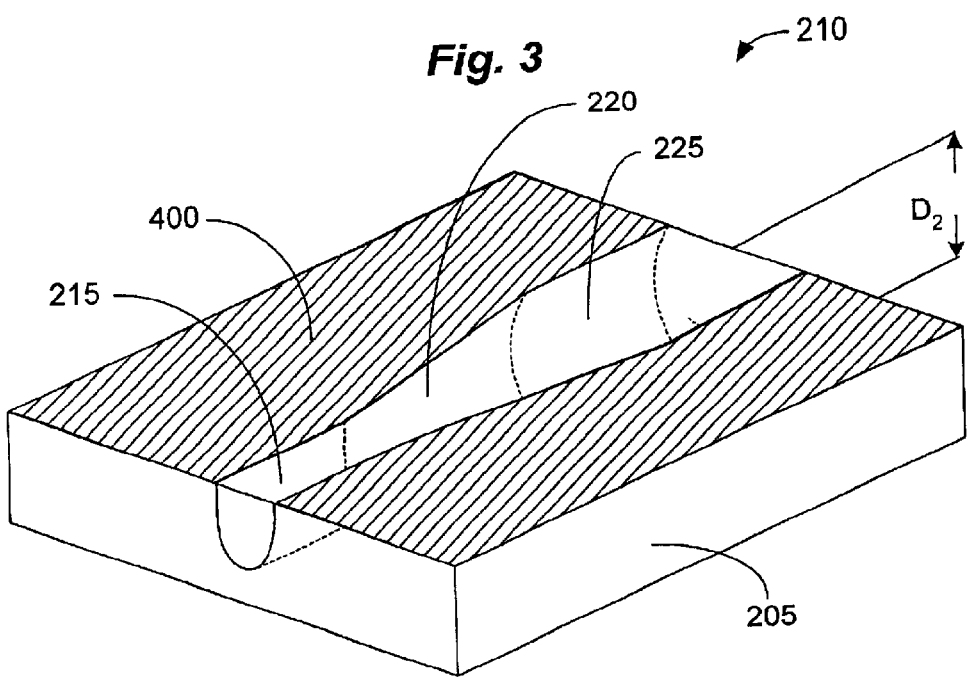
FIG. 4 is a diagram illustrating another exemplary mask according to the present invention which exposes an input section, a tapered section, and the output section of an optical waveguide disposed within a planar substrate.

Referring to FIG. 4, this figure illustrates another exemplary stage of fabrication for the waveguide 210 disposed within the planar substrate 205. This figure illustrates another stage of fabrication for the waveguide 210 disposed within the planar substrate 205. In this figure, a second mask 400 can expose the output section 225, the entire tapered section 220, and the input section 215 of the waveguide 210. In one exemplary embodiment, similar to that of the first mask 300 illustrated in FIG. 3, the second mask 400 can be designed to resist ion diffusion so that those areas of the planar substrate 205 exposed by the second mask 400 will receive a penetration of metal ions.

The second mask 400 can be used during a second stage of fabrication of the waveguide 210 in which the planar substrate 205 is subjected to an ion diffusion process until a depth of $D_2$ is achieved for the optical waveguide 210.

Figure 5:
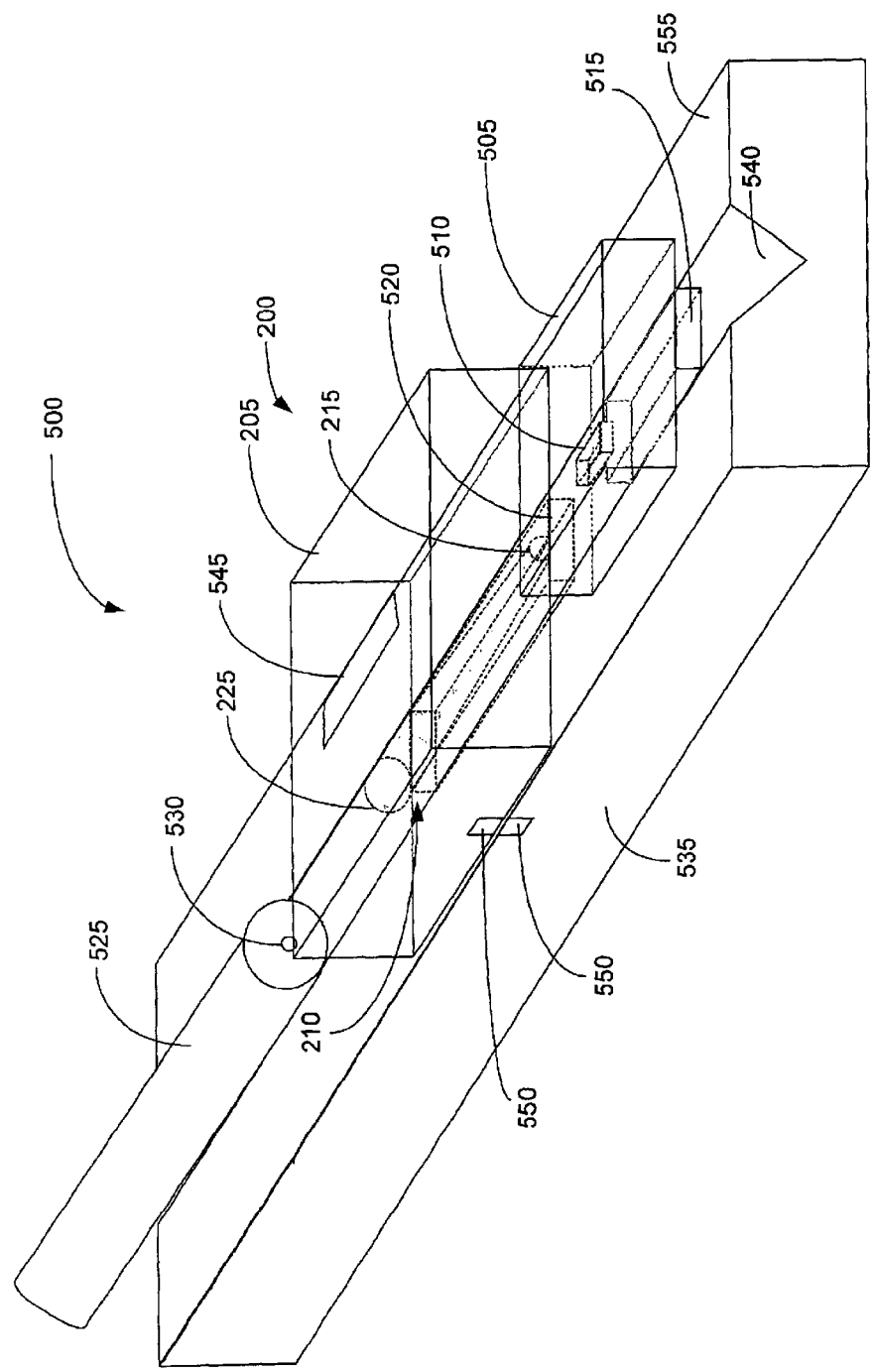
FIG. 5 is a diagram illustrating a system for passively aligning optical devices with an external mode size transformer according to the present invention.

Referring now to FIG. 5, this figure illustrates a system 500 for passively aligning optical devices. The system 500 may comprise the planar substrate 205 containing the optical waveguide 210. A first optical device can comprise the laser diode 505 that comprises an active region 510. The laser diode 505 can be flip-chip bonded onto the alignment surface 555 of the silicon submount 535. Attached to the laser diode 505 is a cladding stripe 515 that can be used to further align the laser diode 505 with the external mode size transformer 200. The external mode size transformer 200 may also include a cladding stripe 520 attached to one side of the optical waveguide 210 to provide for further alignment of the external mode size transformer 200. The second optical device may comprise a single mode optical fiber 525 that includes a core 530. The first and second optical devices 505, 525 and external mode size transformer 200 are positioned on a silicon submount 535 that comprises a v-shaped groove 540. The v-groove 540 can position each of the optical devices 505 and 530 in substantial alignment with the external mode size transformer 200.

The v-groove 540 can receive the cladding 515 of the laser and diode 505 and the cladding 520 of the external mode size transformer 200. By receiving these clad stripes, the v-groove 540 can substantially align the active region 510 with the optical waveguide 210 of the external mode size transformer 200. The v-groove 540 and the optical fiber 525 can have dimensions such that when the optical fiber 525 is bonded to the v-groove 540, the central axis of the core 530 can be elevated just enough above the alignment plane 555 of the silicon submount 535 so as to transversely align an output section 225 of the optical waveguide 210 with the core 530.

The alignment system 500 may further comprise markings on each of the optical devices 505, 525 as well as the external mode size transformer 200 such as marking 545 that may denote the longitudinal axis of the optical waveguide 210. The alignment system 500 may further comprise fiducial marks 550 that are disposed on each of the optical devices 505, 525, the external mode size transformer 200, as well as the silicon submounts 535. By aligning the fiducial marks 550 with one another, the optical devices 505, 525 as well as the external mode size transformer can be properly and efficiently aligned. The alignment system 500 may further comprise stops (not shown) to aid in the longitudinal positioning of the optical ailments. For example, if a longitudinal gap is needed between the laser diode 505 and the external mode size transformer 200, then stops (not shown) the disposed within the v-groove 540 can prevent any direct contact between the laser diode 505 and the external mode size transformer 200.

Figure 6:
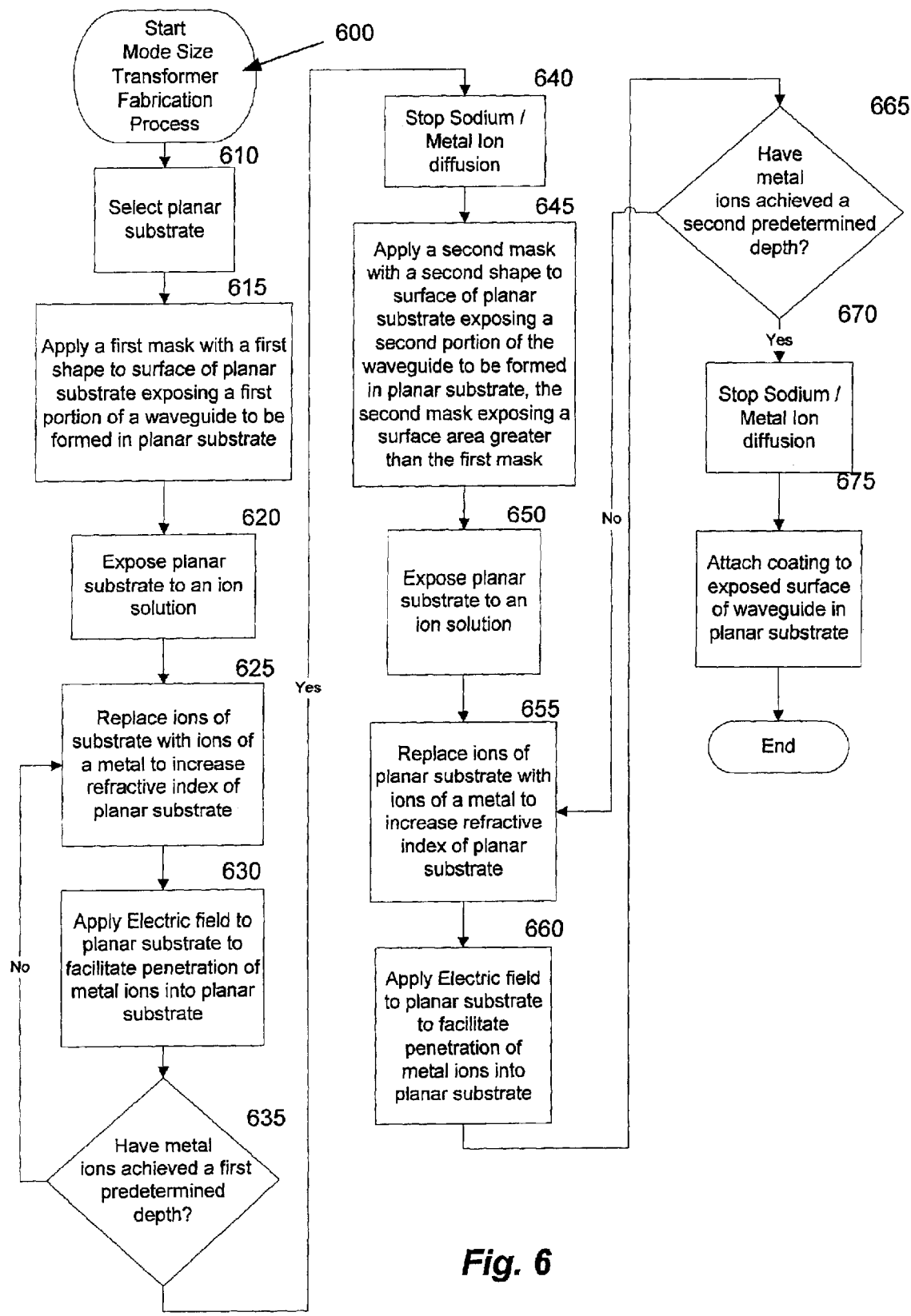
FIG. 6 is a logic flow diagram illustrating an exemplary embodiment of a method for creating an external mode size transformer according to the present invention.

Referring now to FIG. 6, this figure illustrates a logic flow diagram of a method for fabricating the external mode size transformer of the present invention. Certain steps in the processes described below must naturally precede others for the present invention to function as described. However, the present invention is not limited to the order of steps described if such order sequence does not alter the functionality of the present invention. That is, it is recognized that some steps may be performed before or after other steps without departing from the scope and spirit of the present invention.

Step 610 is the first step of the exemplary mode size transformer fabrication process 600 illustrated in FIG. 6. In Step 610, a planar substrate such as substrate 205 as illustrated in FIGS. 2–4 can be selected. Next, in Step 615, a first mask 300 with a first predetermined shape is applied to a surface of the planar substrate 205. The first mask 300 exposes a first portion 305, 225 of a waveguide 210 to be formed in the planar substrate 205.

In Step 620, the planar substrate 205 is exposed to a selected metallic ion solution, such as silver nitrate or potassium nitrate mixed with sodium nitrate. These exemplary chemicals, when heated to their melting points, create a liquid with a predetermined concentration of the metallic ions for diffusion into the planar substrate 205 via ion exchange. The type of metallic ion used, its concentration in the solution, and the temperature of the solution during the ion exchange are all factors that affect the cross-section and refractive index profile of the waveguide region created in the planar substrate 205 through the ion exchange. Those skilled in the art will recognize that other metallic ion solutions are not beyond the scope of the present invention.

In Step 625, the ions of the planar substrate 205 are replaced with ions of a metal to increase the refractive index of the exposed areas of the planar substrate 205. In Step 630, an electric field can be applied to the planar substrate during ion diffusion to facilitate penetration of the metal ions into the planar substrate 205. In Step 635, it is determined whether the metal ions have achieved a first predetermined depth $D_1$. The determination of whether the metal ions have achieved the first predetermined depth $D_1$ is usually a function of time. That is, after a certain amount of time, the metal ions usually achieve a certain depth. If the inquiry to Decision Step 635 is negative, then the "no" branch is followed back to Step 625.

If the inquiry to Decision Step 635 is positive, then the "yes" branch is followed to Step 640 in which the metal ion diffusion process is stopped. In Step 645, a second mask 400 with the second predetermined shape is applied to the surface of the planar substrate 205. The second mask 400 exposes a second portion of the waveguide 210 to be formed in the substrate. The second mask 400, in one exemplary embodiment, can expose a surface area that is greater than the surface area exposed by the first mask 300. Typically, the section portion comprises the input section 215, tapered section 220 and output section 225.

In Step 650, the planar substrate 205 is exposed to a ion solution, such as a buffered metallic salt melt. Next, in Step 655, the sodium ions of the planar substrate 205 are replaced with ions of a metal to increase the refractive index of the planar substrate 205 exposed by the second mask 400.

In Step 660, an electric field is applied to the planar substrate 205 to facilitate penetration of the metal ions into the exposed areas of the planar substrate 205. Next, in the decision step 665, it is determined whether the metal ions have achieved a second predetermined depth $D_2$. As noted above, the determination of depth can be based upon the amount of time the planar substrate 205 is exposed to the ion solution. If the inquiry to the decision step 665 is negative, then the "no" branch is followed back to step 665, if the inquiry to decision step 665 is positive then the "yes" branch is followed to step 670 in which the metal ion diffusion process is stopped. And lastly, in step 675, a coating is attached to the exposed surface of the waveguide 210 in the planar substrate 205. Specifically, in one exemplary environment, the coating can comprise a stripe of glass or polymer having a refractive index similar to that of the planar substrate 205.

Those skilled in the art will appreciate that the number and shapes of the masks 300, 400, the type of metal ions diffused, the sodium content, the finish of the glass, strength of the electric field, the time, and temperature of the ion solution are all factors that can effect the optical characteristics of the optical waveguide 210 created by this process. Those skilled in the art will appreciate any variation of the aforementioned parameters are not beyond the scope of the present invention.

For example, to form an input section 215 having an abrupt change in its refractive index and an output section 225 with a gradual change in its refractive index, a mask (not shown) exposing only the input section 215 can be applied to the planar substrate 205. At this point, a silver ion solution can be applied to the input section 215 to achieve the abrupt change in the input section's refractive index. Next another mask (not shown) can be applied to the planar substrate 205 that exposes only the output section 225. At this point, a potassium ion solution can be applied to the output section 225 in order to form a waveguide section with a gradual or smooth change in the refractive index.

Figure 7:
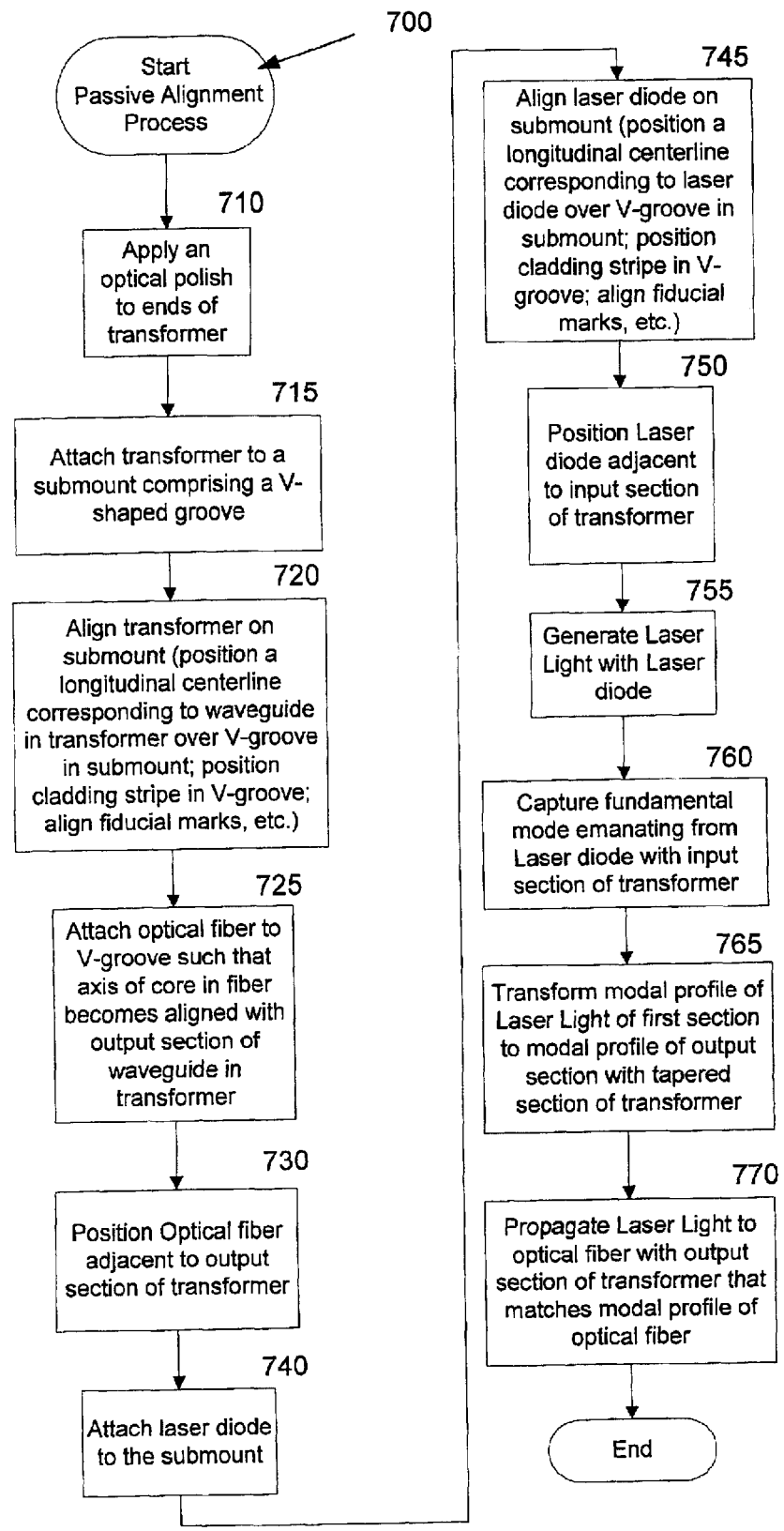
FIG. 7 is a logic flow diagram illustrating an exemplary embodiment of a method for passively aligning optical devices with an external mode size transformer according to the present invention.

Referring now to FIG. 7, this figure illustrates an exemplary process for the passive alignment of optical devices. Similar to the process illustrated in FIG. 6, certain steps in the processes described below must naturally precede others for the present invention to function as described. However, the present invention is not limited to the order of steps described if such order sequence does not alter the functionality of the present invention. That is, it is recognized that some steps may be performed before or after other steps without departing from the scope and spirit of the present invention.

Step 710 is the first step of the passive alignment process 700. Referring now to FIG. 7, the figure illustrates a logic flow diagram of a method for fabricating the external mode size transformer of the present invention. Certain steps in the processes described below must naturally precede others for the present invention to function as described. However, the present invention is not limited to the order of steps described if such order sequence does not alter the functionality of the present invention. That is, it is recognized that some steps may be performed before or after other steps without departing from the scope and spirit of the present invention.

In step 710, an optical polish can be applied to the end of the external mode size transformer 200. That is, the optical polish can be applied to the end-face containing the input section 215 and the end face containing the output section 225 of the optical waveguide 210.

In step 715, the transformer 200 can be attached to a silicon submount 535 comprising a V-shape grooves 540. Those skilled in the art will appreciate that the present invention is not limited to silicon submounts with V-shaped groove 540. Is not beyond the scope of the present invention to include other shaped grooves that facilitate the alignment of optical devices.

In step 720, the transformer 200 is aligned on the silicon submount 535. Alignment can be facilitated by positioning a longitudinal center line 545 corresponding to the waveguide 210 in the transformer 200. The longitudinal center line 545 can be positioned over the V-groove 540 and the silicon submount 535. Further, a cladding stripe such as stripe 515 and stripe 520 can be positioned within the v-groove 540. And lastly, fiducial marks such as mark 550 disposed on the transformer 200 and silicon submount 535 can be aligned.

In step 725, the first optical device such as the optical fiber 525 can be attached to the v-groove 540 such that an axis of the core 530 in the fiber 525 becomes aligned with the output section 225 of the waveguide 210 in the transformer 200. Next, in step 730, the optical fiber 525 can be positioned adjacent to the output section 225 of the external mode size transformer 200. In step 740, the second optical device such as a laser diode 505 can be flip-chip bonded to the silicon submount 535. Next, in step 745, the laser diode 505 can be aligned on the silicon submount 535. Similar to step 720, the laser diode 505 can be aligned on the silicon submount by utilizing a longitudinal center line (not shown) corresponding to an active region of the laser diode over the v-groove in the silicon submount 535. Further, the laser diode 505 can be further aligned with in the v-groove 540 with a cladding stripe 515. And lastly, the laser diode 505 can be further positioned within the v-groove 540 with fiducial marks (not shown).

In step 750, the laser diode 505 can be positioned adjacent to the input section 215 of the external mode size transformer 200. In step 755, the laser diode 505 can generate laser light energy.

Subsequently, in step 760, a fundamental mode of the laser light energy can be captured with the input section 215 of the external mode size transformer 200. In step 765, the modal profile of the laser light of the first section 215 can be transformed to the modal profile of the output section 210 by propagating the light energy through the tapered section 220 of the external mode size transformer 200. And in step 770, the laser light can be propagated to the optical fiber 520 through the output section 225 of the transformer 200 which matches the modal profile of the optical fiber 525.

An external mode size transformer 200 designed and fabricated according to the present invention can be combined with other optical devices to create more complex integrated object devices. For example, hybrid-integrated optical devices that would be enabled or improved by the inclusion of the external mode size transformer of the present invention include, but are not limited to, the following: a fiber grating stabilized laser comprising a laser diode, the external mode size transformer 200, and a Fiber Bragg grating; a distributed Bragg reflector laser comprising a laser diode and the external mode size transformer 200 of the present invention onto which a Bragg grating reflector has been built; a mode expanded semi-conductor optical amplifier comprising a semi-conductor optical amplifier and external mode size transformer 200 at both input and output facet of the semi-conductor optical amplifier; an arrayed laser comprising multiple laser diodes and a fiber ribbon coupler incorporating multiple external mode size transformers 200 of the present invention; a wave length division amplifier comprising an arrayed waveguide grating, multiple semi-conductor optical amplifiers, and the fiber ribbon coupler incorporating external mode size transformers 200 of the present invention; an optical add/drop multiplexer comprising a laser diode, photo diode, wave length channel filters, and the planar light guide circuit incorporating a mode size transformer 200 with a Bragg grating reflector. Other combinations of the external mode size transformer 200 of the present invention with other optical devices are not beyond the scope of the present invention.

It should be understood that the foregoing only relates to the illustrative embodiments of the present invention, and that numerous changes may be made therein without departing from the spirit and scope of the invention as defined by the following claims.

What is claimed is:

1. A method for passively aligning two optical devices for transferring light energy therebetween, comprising the steps of:

positioning a mode size transformer on a submount with a groove;

positioning a first optical device having a first modal profile on the submount having a groove;

aligning the first optical device with the transformer by sliding one of the first optical device and transformer along the groove, the transformer comprising a tapered waveguide section having a smoothly varying cross sectional area;

positioning a second optical device having a second modal profile on the submount; and aligning the second optical device with the transformer by sliding one of the second optical device and transformer along the groove.

2. The method of claim 1, further comprising the steps of:

receiving light energy from the first optical device with the transformer;

transforming the light energy from the first modal profile to the second modal profile; and propagating the light energy to the second optical device.

3. The method of claim 2, wherein the step of transforming the light energy, further comprises the steps of:

receiving the light energy at a first end of a tapered waveguide section having a first cross sectional area;

propagating the light energy along the tapered waveguide section having a variable cross section;

sending the light energy through a second end of the tapered waveguide section having a second cross sectional area substantially greater than the first cross sectional area.

4. The method of claim 1, further comprising the step of propagating light energy from the first optical device through a waveguide of the transformer to the second optical device.

5. The method of claim 1, wherein the step of aligning the first optical device with the transformer further comprises the step of positioning a longitudinal centerline marker of the first optical device over the groove.

6. The method of claim 1, wherein the step of aligning the first optical device with the transformer further comprises the step of positioning a clad stripe within the groove.

7. The method of claim 1, wherein the step of aligning the first optical device with the transformer further comprises the step of aligning a fiducial mark on the first optical device with a fiducial mark on the submount.

8. The method of claim 1, wherein the step of positioning the first optical device having a first modal profile on the submount further comprises the step of positioning a laser diode to the submount.

9. The method of claim 1, wherein the step of positioning the second optical device having a second modal profile on the submount further comprises the step of positioning an optical fiber within the groove of the submount.

* * * * *